United States Patent
Fazeli et al.

(10) Patent No.: US 9,387,924 B2
(45) Date of Patent: Jul. 12, 2016

(54) METHOD OF INITIALIZING A LANDING GEAR SHOCK STRUT

(71) Applicant: Goodrich Corporation, Charlotte, NC (US)

(72) Inventors: Amir M. Fazeli, Milton (CA); Adnan Cepic, Mississauga (CA); Susanne M. Reber, Middleburg Heights, OH (US)

(73) Assignee: Goodrich Corporation, Charlotte, NC (US)

(*) Notice: Subject to any disclaimer, the term of this patent is extended or adjusted under 35 U.S.C. 154(b) by 70 days.

(21) Appl. No.: 14/317,977

(22) Filed: Jun. 27, 2014

(65) Prior Publication Data

US 2015/0266569 A1  Sep. 24, 2015

Related U.S. Application Data

(60) Provisional application No. 61/968,449, filed on Mar. 21, 2014.

(51) Int. Cl.
| | |
|---|---|
| *B64C 25/60* | (2006.01) |
| *F16F 9/43* | (2006.01) |
| *F16F 9/06* | (2006.01) |
| *B64F 5/00* | (2006.01) |

(52) U.S. Cl.
CPC .............. *B64C 25/60* (2013.01); *B64F 5/0045* (2013.01); *F16F 9/06* (2013.01); *F16F 9/43* (2013.01); *F16F 2230/46* (2013.01); *Y10T 29/49718* (2015.01)

(58) Field of Classification Search
CPC .......... B64C 25/60; B64F 5/0045; F16F 9/06; F16F 9/43; F16F 2230/46; Y10T 29/49718
See application file for complete search history.

(56) References Cited

U.S. PATENT DOCUMENTS

| | | | |
|---|---|---|---|
| 5,148,896 A | 9/1992 | Ralph | |
| 7,552,803 B2 | 6/2009 | Luce | |
| 2011/0209955 A1* | 9/2011 | Lavigne | .................. B64C 25/60 188/322.13 |
| 2014/0046533 A1 | 2/2014 | Nance | |

FOREIGN PATENT DOCUMENTS

GB  2170294 A  7/1986

OTHER PUBLICATIONS

Extended European Search Report, EP Application No. 15159726.7, dated Feb. 29, 2016, 7 pages.

* cited by examiner

*Primary Examiner* — Ryan J Walters
(74) *Attorney, Agent, or Firm* — Kinney & Lange, P.A.

(57) ABSTRACT

A method of servicing a shock strut of a landing gear includes partially filling the shock strut with fresh oil and pressurizing the chamber with gas. The pressurizing is to a pressure level that compensates for expected gas pressure loss due to gas entrainment in the oil during operation of the shock strut. The method can be performed without weight on wheels, with weight on wheels and a constant strut stroke, or weight on wheels and a constant pressure.

3 Claims, 1 Drawing Sheet

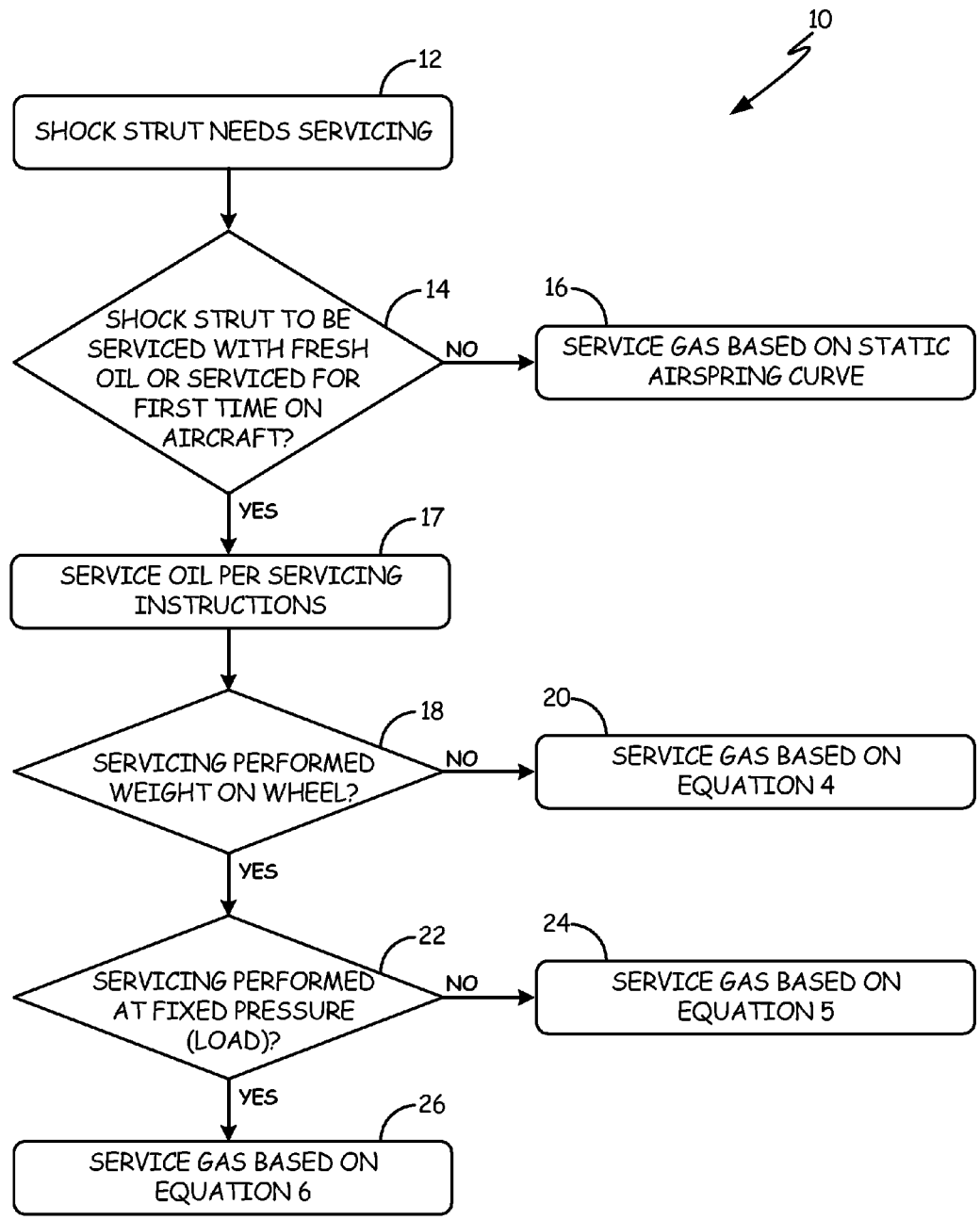

METHOD OF INITIALIZING A LANDING GEAR SHOCK STRUT

CROSS-REFERENCE TO RELATED APPLICATION(S)

This application claims priority to U.S. Provisional Application Ser. No. 61/968,449, entitled "LANDING GEAR SHOCK STRUT INITIAL OVER-PRESSURIZING TO COMPENSATE FOR GAS ENTRAINMENT" filed Mar. 21, 2014, which is incorporated by reference.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common and necessary component in most aircraft landing gear assemblies. The shock struts used in the landing gear of aircraft generally are subject to more demanding performance requirements than most if not all ground vehicle shock absorbers. In particular, shock struts must control motion of the landing gear, and absorb and damp loads imposed on the gear during landing, taxiing and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Over time the gas and/or oil may leak from the telescoping cylinders and cause a change in the performance characteristics of the strut. While gas pressure can be readily monitored, it cannot be readily determined if a loss in gas pressure arose from leakage of gas alone or from leakage of both gas and oil, unless external evidence of an oil leak is noticed by maintenance personnel. If a low pressure condition is detected in the absence of external evidence of an oil leak, maintenance personnel heretofore would restore the gas pressure to a prescribed level by adding gas. This, however, eventually leads to degraded performance of the shock strut if oil had indeed escaped from the strut. Even if evidence of a oil leak is observed, maintenance personnel cannot easily determine how much oil remains or whether the remaining amount of oil meets specifications or is acceptable for operation.

A landing gear shock strut damping performance is the result of the internal design, fluid volume and gas pressure. It is a well-known fact that after the initial gas servicing of the shock strut, serviced with fresh oil, and several subsequent aircraft landing(s), a shock strut gas pressure drops due to the gas entrainment in oil in mixed fluid-gas shock struts. The pressure reduction associated with gas entrainment, however, has never been analytically quantified. This loss of pressure results in an adverse modification of the damping performance of the shock strut. To compensate for this pressure loss and maintain the desired damping, operators typically re-service the shock strut with gas after few flights. This current practice assumes the pressure reduction is solely due to gas entrainment and therefore could overlook either gas or oil leakage in the system. In addition, this practice requires additional maintenance time.

SUMMARY

A method of servicing a shock strut of a landing gear includes partially filling the shock strut with fresh oil and pressurizing the chamber with gas. The pressurizing is to a pressure level that compensates for expected gas pressure loss due to gas entrainment in the oil during operation of the shock strut.

BRIEF DESCRIPTION OF THE DRAWINGS

FIG. 1 is a flow chart illustrating a method of gas servicing a landing gear shock strut.

DETAILED DESCRIPTION

This invention provides a new and unique method of determining the amount of pressure loss associated with initial gas entrainment for the freshly serviced shock strut and therefore eliminates the additional maintenance action/re-servicing. First, this includes the mathematical method of determining the pressure loss associated with initial gas entrainment. Second, the mathematical method is also utilized to specify a higher initial servicing pressure to account for the initial gas entrainment.

Any liquid in contact with gas can have the following saturation states:

Under-saturated: The amount of gas dissolved in liquid is less than what liquid can dissolve. Liquid dissolves more gas over time to reach to the saturated state.

Saturated: Liquid is in stable equilibrium with gas. No mass transfer takes place at gas/liquid boundary.

Over-saturated: The amount of gas dissolved in liquid is more than the liquid capacity. Liquid loses some gas over time to reach to the saturated state.

Henry's law states that at a constant temperature, the amount of dissolved gas that can saturate a given volume and type of fluid in steady state is directly proportional to the gas partial pressure. Henry's law has the following mathematical representation:

$$n_{gas} = V_{liquid} \times f(P_{gas}, T) \qquad \text{Eq. 1}$$

where, $n_{gas}$ is the number of moles of gas dissolved in liquid in saturated state, $V_{liquid}$ is the liquid volume, $P_{gas}$ is the gas partial pressure and T is temperature. At a given temperature, based on Henry's law, $f(P_{gas}, T)$ is rewritten as follows:

$$f(P_{gas}, T) = C(T) \times P_{gas} \qquad \text{Eq. 2}$$

where C(T) is a coefficient that has to be defined experimentally for each set of liquid and gas types as a function of temperature. Thus, the initial pressure drop due to oil saturation at a given servicing temperature can be calculated based on the following equation:

$$\Delta P = P_{gas,service}\left(1 - \frac{V_{gas}(0)}{V_{gas}(0) + V_{oil}C(T)RT}\right) \qquad \text{Eq. 3}$$

where, $P_{gas,service}$ is the pressure to which the shock strut is serviced initially, $V_{gas}(0)$ is the gas volume in fully extended position, R is the ideal gas constant, $V_{oil}$ is the oil volume and T is temperature.

Servicing with No Weight on Wheels

Once the initial pressure drop is determined, the pressure to which the shock strut (with no weight on wheels) has to be over pressurized to compensate for the initial gas entrainment is determined as follows:

$$P_{gas,service} = P_{gas,nominal}\left(\frac{V_{gas}(0) + V_{oil}C(T)RT}{V_{gas}(0)}\right) \quad \text{Eq. 4}$$

where $P_{gas,nominal}$ is the nominal/desired gas pressure in fully extended position.

To derive the servicing pressure, it was assumed that the shock strut was serviced with fresh oil.

Servicing with Weight on Wheels and Fixed Strut Stroke

If oil and gas servicing is performed with weight on wheels and at a fixed shock strut stroke, then the pressure to which gas has to be serviced at the stroke, s, is determined as follows:

$$P_{gas,airspring}(s) = P_{gas,nominal}\left(\frac{V_{oil} \times C(T)RT}{V_{gas}(s)}\right) + \underbrace{P_{gas,airspring}(s)}_{\text{static airspring curve}} \quad \text{Eq. 5}$$

where $P_{gas,airspring}(s)$ is the pressure corresponding to stroke s on static airspring curve and $V_{gas}(s)$ is the gas volume at stroke s.

Servicing with Weight on Wheels and at Constant Pressure

If oil and gas servicing is performed with weight on wheels and at a constant pressure (i.e. constant load), which is the typical servicing procedure, then the stroke to which shock strut has to be serviced at the pressure, $P_{gas,service}$, is determined as follows:

$$S(P_{gas,service}) = \frac{P_{gas,nominal}}{P_{gas,service}} \times \frac{V_{oil}}{A_p} \times C(T)RT + \underbrace{S_{airspring}(P_{gas,service})}_{\text{static airspring curve}} \quad \text{Eq. 6}$$

where $S_{airspring}(P_{gas,service})$ is the stroke corresponding to $P_{gas,service}$ on the static airspring curve and $A_p$ is the shock strut piston area.

It is to be noted that the shock strut over-pressurization is only needed if oil is replenished (i.e. fresh oil introduced into the strut) during shock strut servicing.

This method has determined that the pressure to which the shock strut should be initially serviced is dependent on the physical parameters of the shock strut such as its nominal gas pressure, gas volume in fully extended position and oil volume. This invention eliminates the need for additional maintenance to re-service the shock strut due to initial gas entrainment.

FIG. 1 shows gas servicing method 10, which is performed when a landing gear shock strut requires servicing (step 12). First, a determination is made as to whether the oil in the strut needs to be serviced by adding fresh oil (step 14). If not, then service proceeds by adding gas to the strut based on a static airspring curve (step 16). If yes, then fresh oil is added per servicing instructions for the shock strut (step 17).

If oil is serviced (i.e., fresh oil is added to the strut), then a determination is made as to which of three different gas servicing protocols is taken. At step 18, a determination is made whether servicing will be performed with weight on wheels. If no, then gas is serviced according to Equation 4 (step 20). If yes, then a determination is made whether servicing will be performed at a fixed (constant) pressure (load) (step 22). If no, then gas is serviced according to Equation 5 (step 24). If yes, the gas is serviced according to Equation 6 (step 26).

The shock strut servicing instruction/chart should be altered/established to account and compensate for the initial gas entrainment according to the flow chart shown in FIG. 1.

With this method, the loss of gas pressure caused by gas entrainment is quantified and compensated for during servicing of the shock strut. As a result, the need for re-servicing after a few takeoffs and landings is eliminated, which provides a significant saving in time and cost.

DISCUSSION OF POSSIBLE EMBODIMENTS

The following are non-exclusive descriptions of possible embodiments of the present invention.

A method of servicing a shock strut of a landing gear partially filling a chamber of the shock strut with a predetermined amount of fresh oil and pressurizing the chamber with gas to level that compensates for expected gas pressure loss due to gas entrainment in the oil during operation of the shock strut.

The method of the preceding paragraph can optionally include, additionally and/or alternatively, any one or more of the following features, configurations and/or additional components:

If servicing is performed without weight on wheels of the landing gear, then the chamber is pressurized to a level of:

$$P_{gas,service} = P_{gas,nominal}\left(\frac{V_{gas}(0) + V_{oil}C(T)RT}{V_{gas}(0)}\right)$$

If servicing is performed with weight on wheels of the landing gear and at a constant shock strut stroke then the chamber is pressurized to a level of:

$$P_{gas,airspring}(s) = P_{gas,nominal}\left(\frac{V_{oil} \times C(T)RT}{V_{gas}(s)}\right) + \underbrace{P_{gas,airspring}(s)}_{\text{static airspring curve}}$$

If servicing is performed with weight on wheels of the landing gear and at a constant pressure, then the chamber is pressured to produce a strut shock stroke of:

$$S(P_{gas,service}) = \frac{P_{gas,nominal}}{P_{gas,service}} \times \frac{V_{oil}}{A_p} \times C(T)RT + \underbrace{S_{airspring}(P_{gas,service})}_{\text{static airspring curve}}$$

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of servicing a shock strut of a landing gear without weight on wheels of the landing gear, the method comprising:
    partially filling a chamber of the shock strut with a predetermined amount of fresh oil; and
    pressurizing the chamber with gas to a level that compensates for expected gas pressure loss due to gas entrainment in the oil during operation of the shock strut, wherein the pressurizing is performed without weight on wheels of the landing gear, and the chamber is pressurized to a pressure $P_{gas,service}$ of:

$$P_{gas,service} = P_{gas,nominal}\left(\frac{V_{gas}(0) + V_{oil}C(T)RT}{V_{gas}(0)}\right)$$

where $P_{gas,nominal}$ is a nominal desired gas pressure with the shock strut in a fully extended position, C(T) is a coefficient based on the oil and gas used in the shock strut, $V_{gas}(0)$ is a gas volume with the shock strut is in a fully extended position, R is an ideal gas coefficient, $V_{oil}$ is oil volume in the shock strut, and T is temperature.

2. A method of servicing a shock strut of a landing gear with weight on wheels of the landing gear, the method comprising:
    partially filling a chamber of the shock strut with a predetermined amount of fresh oil; and
    pressurizing the chamber with gas to a level that compensates for expected gas pressure loss due to gas entrainment in the oil during operation of the shock strut, wherein the pressurizing is performed with weight on wheels of the landing gear and at a constant shock strut stroke and the chamber is pressurized to a pressure $P_{gas,airspring}(s)$ of:

$$P_{gas,airspring}(s) = P_{gas,nominal}\left(\frac{V_{oil} \times C(T)RT}{V_{gas}(s)}\right) + \underbrace{P_{gas,airspring}(s)}_{\text{static airspring curve}}$$

where $P_{gas,nominal}$ is a nominal desired gas pressure with the shock strut in fully extended position, C(T) is a coefficient based on the oil and gas used in the shock strut, $V_{oil}$ is oil volume in the shock strut, R is an ideal gas constant, T is temperature, $V_{gas}(s)$ is the volume of the gas at stroke s, and $$\underbrace{P_{gas,airspring}(s)}_{\text{static airspring curve}}$$

is the pressure corresponding to stroke s on a static airspring curve.

3. A method of servicing a shock strut of a landing gear with weight on wheels of the landing gear, the method comprising:
    partially filling a chamber of the shock strut with a predetermined amount of fresh oil; and
    pressurizing the chamber with gas to a level that compensates for expected gas pressure loss due to gas entrainment in the oil during operation of the shock strut, wherein the pressurizing is performed with weight on wheels and the chamber is pressurized to a pressure $P_{gas,service}$ to produce a strut shock stroke $S(P_{gas,service})$ of:

$$S(P_{gas,service}) = \frac{P_{gas,nominal}}{P_{gas,service}} \times \frac{V_{oil}}{A_p} \times C(T)RT + \underbrace{S_{airspring}(P_{gas,service})}_{\text{static airspring curve}}$$

where $P_{gas,nominal}$ is a nominal desired gas pressure with the shock strut in fully extended position, $V_{oil}$ is oil volume in the shock strut, $A_p$ is a shock strut piston area, C(T) is a coefficient based on the oil and gas used in the shock strut, R is an ideal gas constant, T is temperature, and $$\underbrace{S_{airspring}(P_{gas,service})}_{\text{static airspring curve}}$$

is the stroke corresponding to $P_{gas,service}$ on a static airspring curve.

* * * * *